United States Patent
Kapil et al.

(10) Patent No.: US 8,208,467 B2
(45) Date of Patent: Jun. 26, 2012

(54) METHOD AND APPARATUS FOR MODULATING THE WIDTH OF A HIGH-SPEED LINK

(75) Inventors: Sanjiv Kapil, Cupertino, CA (US); David J. Greenhill, Portola Valley, CA (US); Robert P. Masleid, Monte Sereno, CA (US)

(73) Assignee: Oracle America, Inc., Redwood Shores, CA (US)

( * ) Notice: Subject to any disclaimer, the term of this patent is extended or adjusted under 35 U.S.C. 154(b) by 369 days.

(21) Appl. No.: 12/485,395

(22) Filed: Jun. 16, 2009

(65) Prior Publication Data

US 2010/0316065 A1    Dec. 16, 2010

(51) Int. Cl.
  *H04L 12/28* (2006.01)
  *H04J 3/18* (2006.01)
  *H04H 20/28* (2008.01)

(52) U.S. Cl. ........ 370/392; 370/394; 370/400; 370/477; 370/487

(58) Field of Classification Search .................. 370/464, 370/477, 487, 392, 394, 400
See application file for complete search history.

(56) References Cited

U.S. PATENT DOCUMENTS

| | | | |
|---|---|---|---|
| 6,246,698 B1 * | 6/2001 | Kumar | 370/487 |
| 7,150,021 B1 * | 12/2006 | Vajjhala et al. | 718/104 |
| 7,936,785 B2 * | 5/2011 | Ehret et al. | 370/473 |
| 2007/0150762 A1 * | 6/2007 | Sharma et al. | 713/300 |
| 2008/0062873 A1 * | 3/2008 | Semrad et al. | 370/232 |
| 2008/0304519 A1 * | 12/2008 | Koenen et al. | 370/477 |
| 2009/0080428 A1 * | 3/2009 | Witkowski et al. | 370/392 |
| 2009/0086735 A1 * | 4/2009 | Tsang | 370/394 |
| 2009/0154337 A1 * | 6/2009 | Kim et al. | 370/216 |

* cited by examiner

*Primary Examiner* — Brandon Renner
(74) *Attorney, Agent, or Firm* — Park, Vaughan, Fleming & Dowler LLP; Anthony Jones (57) ABSTRACT

The described embodiments include a system that modulates the width of a high-speed link. The system includes a transmitter circuit coupled to a high-speed link that includes N serial lanes. During operation, while using a first number of lanes to transmit frames on the high-speed link, the transmitter circuit determines a second number of lanes to be used to transmit frames on the high-speed link based on a bandwidth demand on the high-speed link. The transmitter circuit then sends an indicator of the second number of lanes to a receiver on the high-speed link. Upon receiving an error-free acknowledgment of the indicator from the receiver, starting from a predetermined frame, the transmitter circuit transmits subsequent frames on the high-speed link using the second number of lanes.

17 Claims, 8 Drawing Sheets

METHOD AND APPARATUS FOR MODULATING THE WIDTH OF A HIGH-SPEED LINK

BACKGROUND

1. Field of the Invention

The described embodiments relate to techniques for improving the performance of computer systems. More specifically, the described embodiments relate to a method and apparatus for modulating the width of a high-speed link.

2. Related Art

Many computer systems use serializer/deserializer (SERDES) links for high-speed communications. For example, in some computer systems, processors can communicate with one another using SERDES links. In addition, SERDES links may also be used for memory and coherence interconnects.

Generally, a SERDES link includes a set of unidirectional serial lanes. During operation, each lane in a SERDES link is used to transfer a corresponding portion of blocks, or "frames," of data across the link, while other portions of the frames are being transferred in parallel using the other lanes. Bidirectional communication can be enabled using a SERDES link in each direction between two communicating entities.

Unfortunately, in many systems, the SERDES links consume enough power to have a noticeable impact on the system's power budget. This problem is worsened by the fact that during times when the SERDES links are idle (i.e., not transferring useful data), idle or no-operation (NOP) frames are still sent across the link. In addition, even when the link is idle, "sync frames" must be sent across the link every Nth frame (e.g., 32nd-42nd frame) to ensure that a clock data recovery circuit in a receiver on the SERDES link receives sufficient transitions to maintain the receiver's clock in synchronization with the transmitter's clock. Sending the idle/NOP frames and the sync frames whether or not data is being transferred across the SERDES link, means that the SERDES link consumes power even when useful data is not being transferred across the link.

In an attempt to conserve power on SERDES links, system designers have provided low-power states that can be used to conserve power in periods when the bandwidth demands are very low (e.g., the "L0s" and "L1" states). In the low-power states, the circuits that transmit and receive data on a given SERDES link can be partially or completely shut off to conserve power. For example, in some systems, in the L0s state, no idle/NOP frames are sent across the link, although sync frames are still sent every Nth frame. In contrast, in the L1 state, no frames are sent across the link. However, there is significant protocol overhead associated with entering and exiting the low-power states, which means that transitions into and out of the low-power state require a significant amount of time. Thus, the low-power states are useful only in cases where the system has time available for the transitions.

SUMMARY

The described embodiments provide a system (e.g., computer system 100) that modulates the width of a high-speed link. The system includes a transmitter circuit coupled to a high-speed link that includes N serial lanes. During operation, while using a first number of lanes to transmit frames on the high-speed link, the transmitter circuit determines a second number of lanes to be used to transmit frames on the high-speed link based on a bandwidth demand on the high-speed link. The transmitter circuit then sends an indicator of the second number of lanes to a receiver on the high-speed link. Upon receiving an error-free acknowledgment of the indicator from the receiver, the transmitter circuit transmits subsequent frames on the high-speed link using the second number of lanes. In some embodiments, the transmitter circuit starts from a predetermined frame when starting to transmit the subsequent frames on the high-speed link using the second number of lanes.

In some embodiments, when sending the indicator of the second number of lanes, the transmitter circuit includes an indicator of the second number of lanes in a sync frame sent to the receiver. In some embodiments, the transmitter circuit sends a message to the receiver on a side-band signal associated with the high-speed link.

In some embodiments, the transmitter circuit can receive an error signal from the receiver in response to the indicator. In these embodiments, upon receiving the error signal, the transmitter circuit resends the indicator of the second number of lanes to the receiver. Upon receiving the error signal in response to the indicator and resending the indicator a predetermined number of times, the transmitter circuit terminates attempting to change the number of lanes and continues transmitting frames on the high-speed link using the first number of lanes.

In some embodiments, the error signal is a cyclic redundancy check (CRC) error message received in a status frame from the receiver.

In some embodiments, the transmitter circuit can receive a "forced-modulation" signal that causes the transmitter circuit to set the number of lanes used to transmit frames to an indicated third number of lanes or to a predetermined third number of lanes. As part of this process, the transmitter circuit sends an indicator of the third number of lanes to the receiver on the high-speed link, regardless of the bandwidth demand on the high-speed link. Upon receiving an error-free acknowledgment of the indicator of the third number of lanes from the receiver, transmit subsequent frames on the high-speed link using the third number of lanes.

In some embodiments, starting with a predetermined frame after receiving the acknowledgment involves starting with: (1) a next sync frame; (2) an Mth frame after sending the indicator; or (3) a Kth frame after receiving the acknowledgement.

In some embodiments, until receiving the acknowledgment of the indicator of the second number of lanes, the transmitter circuit continues transmitting frames on the high-speed link using the first number of lanes.

In some embodiments, when determining the second number of lanes, the transmitter circuit is configured to: (1) determine a decreased number of lanes to be used to transmit frames on the high-speed link based on a decrease in bandwidth demand; or (2) determine an increased number of lanes to be used to transmit frames on the high-speed link based on an increase in bandwidth demand.

In some embodiments, when determining the second number of lanes to be used to transmit frames on the high-speed link, the transmitter circuit determines at least one intermediate number of lanes. The transmitter circuit then transitions from the first number of lanes to the intermediate number of lanes before subsequently transitioning to the second number of lanes. In these embodiments, before sending the indicator of the second number of lanes to the receiver, the transmitter circuit sends an indicator of the intermediate number of lanes to the receiver; receives an error-free acknowledgment of the indicator of the intermediate number of lanes from the receiver; and transmits subsequent frames on the high-speed link using the intermediate number of lanes (similarly to the change to the second number of lanes described above). The transmitter circuit then sends the indicator of the second number of lanes a predetermined time after starting transmitting frames using the intermediate number of lanes to begin the transition to the second number of lanes.

In some embodiments, when transmitting frames, the transmitter circuit is configured to apportion a set of cells in each frame among the lanes, wherein apportioning the cells involves assigning each cell to a corresponding lane for transmission to the receiver. In these embodiments, the number of cells in each frame can remain constant, regardless of the number of lanes being used to transmit the frames.

In some embodiments, the transmitter circuit determines bandwidth demand by one or more of: (1) determining a number of frames that is presently being transmitted; (2) monitoring commands being transferred across the high-speed link; (3) monitoring one or more system operations that are likely to result in an increase or decrease in the number of frames being transmitted; (4) using a record of prior bandwidth demand levels; (5) using one or more manually or automatically set values of bandwidth demand level; (6) determining a number of transmit credits or receive credits exchanged between the transmitter circuit and the receiver in a predetermined time; (7) determining a number of transmit or receive queue full events or empty events in a predetermined time; or (8) determining changes in an indicator of quality of service (QOS) on the high-speed link.

BRIEF DESCRIPTION OF THE FIGURES

In the figures, like reference numerals refer to the same figure elements.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the system is not limited to the embodiments shown, but is to be accorded the widest scope consistent with the principles and features disclosed herein.

The data structures and code herein described are typically stored on a computer-readable storage device, which may be any device or medium that can store code and/or data for use by a computer system (e.g., computer system 100). The computer-readable storage device includes, but is not limited to, volatile memory, non-volatile memory, magnetic and optical storage devices such as disk drives, magnetic tape, CDs (compact discs), DVDs (digital versatile discs or digital video discs), or other media capable of storing store code and/or data for use by a computer system now known or later developed. Note that non-statutory media such as signals are not included in the computer-readable storage devices in these embodiments.

The methods and processes described herein can be embodied as code and/or data, which can be stored in a computer-readable storage device as described above. When a computer system reads and executes the code and/or data stored on the computer-readable storage device, the computer system performs the methods and processes embodied as data structures and code and stored within the computer-readable storage medium.

Furthermore, the methods and processes described herein can be included in hardware modules. For example, the hardware modules can include, but are not limited to, application-specific integrated circuit (ASIC) chips, field-programmable gate arrays (FPGAs), a dedicated or shared processor, and/or other programmable-logic devices now known or later developed. When the hardware modules are activated, the hardware modules perform the methods and processes included within the hardware modules.

Computer System

Figure 1:
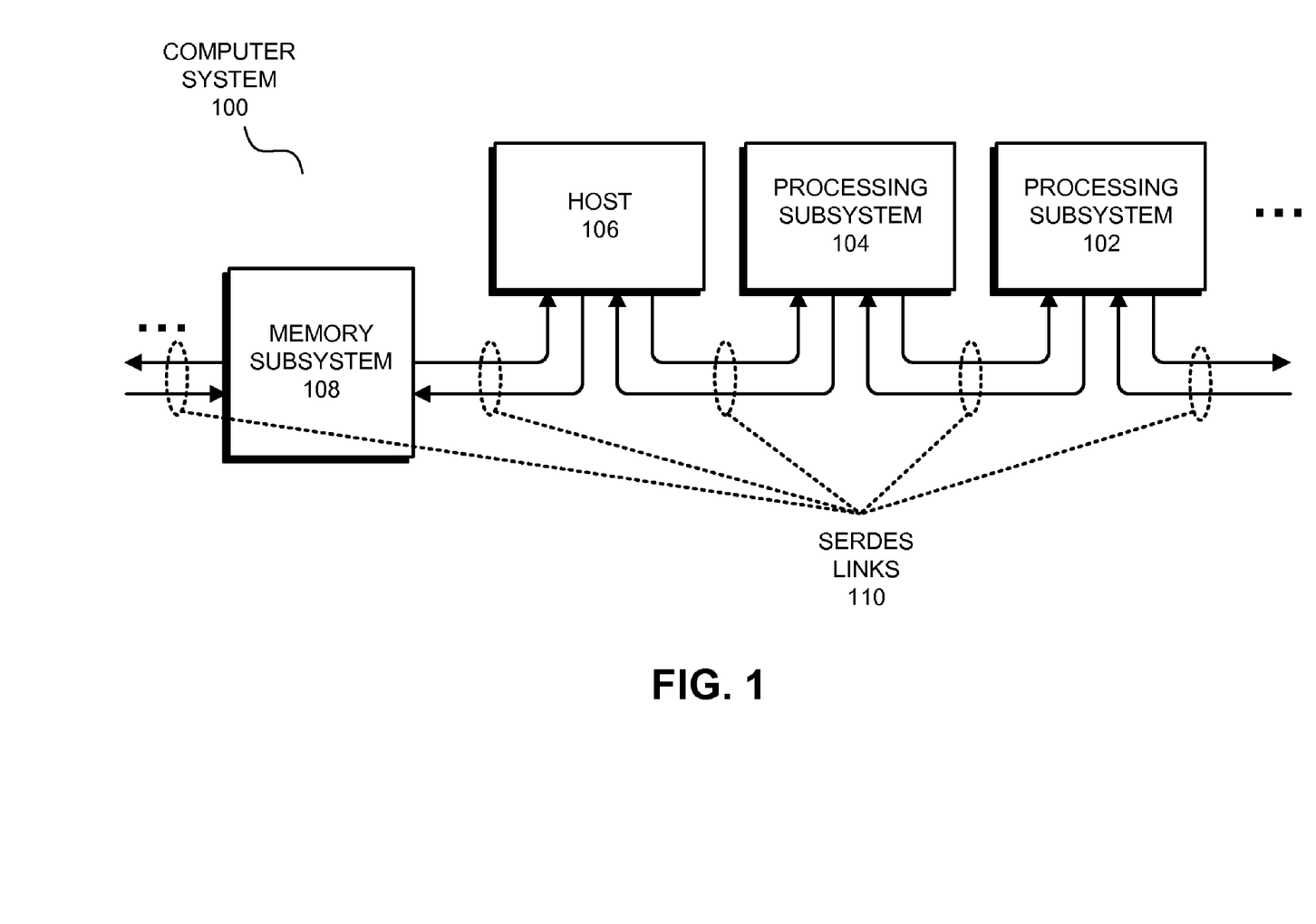
FIG. 1 presents a block diagram of a computer system in accordance with the described embodiments.

FIG. 1 presents a block diagram of a computer system 100 in accordance with the described embodiments. Computer system 100 includes processing subsystems 102 and 104, host 106, memory subsystem 108, and a number of serializer/deserializer (SERDES) links 110 (interchangeably called "links").

Processing subsystems 102 and 104 can include any device configured to perform computational operations. For example, processing subsystems 102 and 104 may comprise one or more microprocessors and/or I/O subsystems. I/O subsystems may include devices such as a direct memory access (DMA) engine, an input-output bridge, a peripheral, a networking device (e.g., a switch), a controller, an application-specific integrated circuit (ASIC), or another type of device. Microprocessors and I/O subsystems are well known in the art and are not described in more detail.

Memory subsystem 108 can include memory for storing data and/or instructions for processing subsystems 102 and 104. For example, the memory subsystem 108 can include one or more dual inline memory modules (DIMMs) that each include a number of separate dynamic random access memory (DRAM) chips that together comprise a memory for computer system 100. In addition, memory subsystem 108 may include other types of memory, caches, ASICs, controller circuits, and/or other functional blocks. In some embodiments, memory subsystem 108 includes a memory hierarchy that includes an arrangement of one or more caches coupled to a memory for computer system 100. Memory subsystems are known in the art and are not described in more detail.

Host 106 can include any device configured to serve as an interface or controller between processing subsystem 104 and memory subsystem 108. For example, in some embodiments host 106 is a memory controller, a buffer, and/or an interface circuit. Hosts are known in the art and are not described in more detail.

Processing subsystems 102 and 104 are coupled to each other and to host 106 using high-speed SERDES links (thereby forming a point-to-point interconnect). As can be seen in FIG. 1, SERDES links 110 include a separate SERDES link 110 in each direction between the processing subsystems 102 and 104, and a separate SERDES link 110 in each direction between processing subsystem 102 and host 106. These SERDES links 110 are used to transmit data and/or commands between the processing subsystems and host 106 in the indicated direction (i.e., in the direction indicated by the arrows in FIG. 1). (Note that although we disclose the components in computer system 100 as being coupled to one another using SERDES links 110, in some embodiments, some of the links may be other types of links, such as on-chip wires, etc.)

The SERDES links 110 also include a separate SERDES link 110 in each direction between host 106 and memory subsystem 108. The SERDES links 110 are used to transmit data and/or commands between host 106 and memory subsystem 108 in the indicated direction. The first of the SERDES links 110 between host 106 and memory subsystem 108 can be referred to as the "downstream" or "southbound" link, on which host 106 transmits data and/or commands to memory subsystem 108. On the other hand, the SERDES link 110 between memory subsystem 108 and host 106 can be referred to as the "upstream" or "northbound" link.

In some embodiments, each SERDES link 110 includes a number of parallel serial channels or "lanes" that are used to transmit data and/or commands on the SERDES links. For example, the some embodiments can include 8, 14, 16, 30, or another number of lanes in each SERDES link 110. When transmitting data across a SERDES link 110, the data is grouped into blocks, or "frames," that are apportioned between the lanes and transmitted in parallel across the link. The arrangement of frames is described in more detail below.

Computer system 100 can be incorporated into many different types of electronic devices. For example, computer system 100 can be part of a desktop computer, a laptop computer, a server, a media player, an appliance, a cellular phone, a piece of testing equipment, a network device (e.g., a switch, bridge, or router), a personal digital assistant (PDA), a hybrid device (i.e., a smart phone), or another electronic device.

Although we use specific components to describe computer system 100, in alternative embodiments, different components may be present in computer system 100. For example, computer system 100 may include video cards, user-interface devices, network cards, drives (e.g., optical drives), and/or other peripheral devices that are coupled to processing subsystem 102 using a bus, a network, or another suitable communication channel (including additional SERDES links). Furthermore, as indicated by the ellipses, computer system 100 can include one or more additional processing subsystems and/or memory subsystems that are coupled to additional SERDES links.

For the purposes of illustration, we present the components of computer system 100 in a "daisy chain" configuration, wherein, for example, using the illustrated SERDES links 110, processing subsystem 102 communicates with host 106 and memory subsystem 108 via processing subsystem 104. That is, processing subsystem 102 sends a request bound for memory subsystem 108 to processing subsystem 104, which determines the destination for the request and forwards the request to host 106 for subsequent forwarding to memory subsystem 108. The response from memory subsystem 108 is returned to processing subsystem 102 via host 106 and processing subsystem 104. Although we show computer system 100 in this configuration, in alternative embodiments, some or all of computer system 100 may be configured differently. For example, processing subsystem 104 may be coupled directly to host 106 and/or memory subsystem 108.

We describe herein operations for modulating link width. In some embodiments, these operations are performed by circuits in computer system 100. For example, a processing subsystem, host, and/or memory subsystem can include some or all of the circuits. In some embodiments, some or all of the circuits can be separate circuits or functional blocks (not shown) configured to perform the operations. In alternative embodiments, general-purpose circuits or dedicated circuits can execute program code, firmware, or other code that causes the circuits to perform the operations.

SERDES Links

Figure 2:
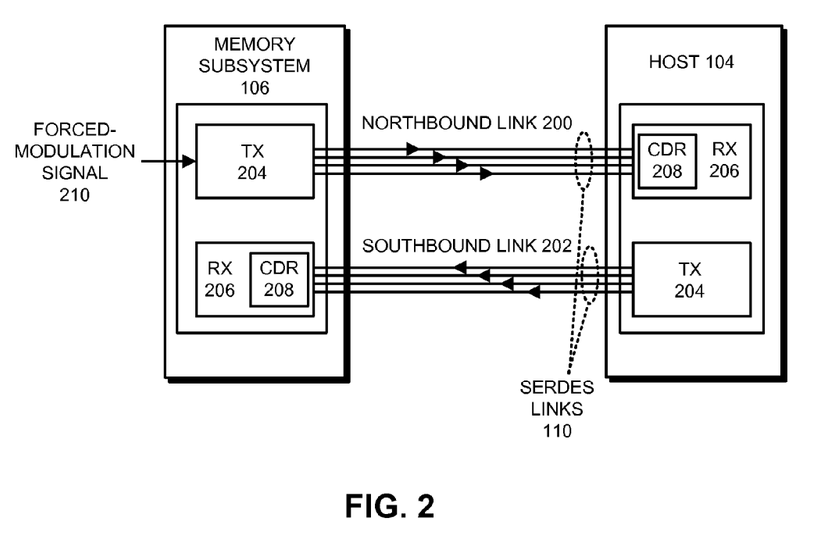
FIG. 2 presents an expanded view of a pair of SERDES links in accordance with the described embodiments.

FIG. 2 presents an expanded view of a pair of SERDES links 110 in accordance with the described embodiments. The SERDES links 110 include northbound link 200 and southbound link 202 coupled between host 106 and memory subsystem 108. Both memory subsystem 108 and host 106 include a transmitter circuit (TX) 204 that is configured to transmit frames (which contain data and/or commands) on the corresponding SERDES link 110. In addition, memory subsystem 108 and host 106 include a receiver circuit (RX) 206 that is configured to receive frames on the corresponding SERDES link 110.

As described above, the SERDES links 110 each include a set of lanes (or serial channels) that are used to transfer data and/or commands. Each lane includes the electrical circuits, wires, and other functional elements that are used to implement the lane within the SERDES link 110. In addition, TX 204 and/or RX 206 can include additional functional blocks or circuits that are used for controlling the operation of the link and handling the transferred frames. For clarity, FIG. 2 shows an embodiment with only four lanes in each SERDES link 110. However, alternative embodiments include different numbers of lanes.

RX 206 in both memory subsystem 108 and host 106 includes a clock and data recovery circuit (CDR) 208 that is configured to extract clock synchronization information from frames received on the corresponding SERDES link 110. More specifically, in the described embodiments, the serial data streams on each lane of the SERDES link 110 are sent without an accompanying clock. Thus, in some embodiments, CDR 208 generates a clock from an approximate frequency reference, and then phase-aligns the clock to the transitions in the data stream using a phase-locked loop (PLL). The phase-aligned clock is then used to control operations in RX 206. (Note that alternative embodiments can use different techniques for extracting the clock synchronization information from the received data.)

Generally, data transmitted across a SERDES link 110 is grouped into "frames" that include a predetermined number of cells. For example, in some embodiments, a frame can include 64, 96, 144, or 168 cells. The cells each include a predetermined number of bits. For example, the cells can include one bit, two bits, or another number of bits. The cells in each frame are apportioned among the lanes for transmission in parallel across the SERDES link 110. Note that the described embodiments can maintain the same number of bits per frame despite modulating the width of the SERDES link 110. As described below, these embodiments can change the "shape" of the frame to enable link width modulation by reallocating all of the cells within the frame among the number of lanes that is in use at the time.

Figure 3:
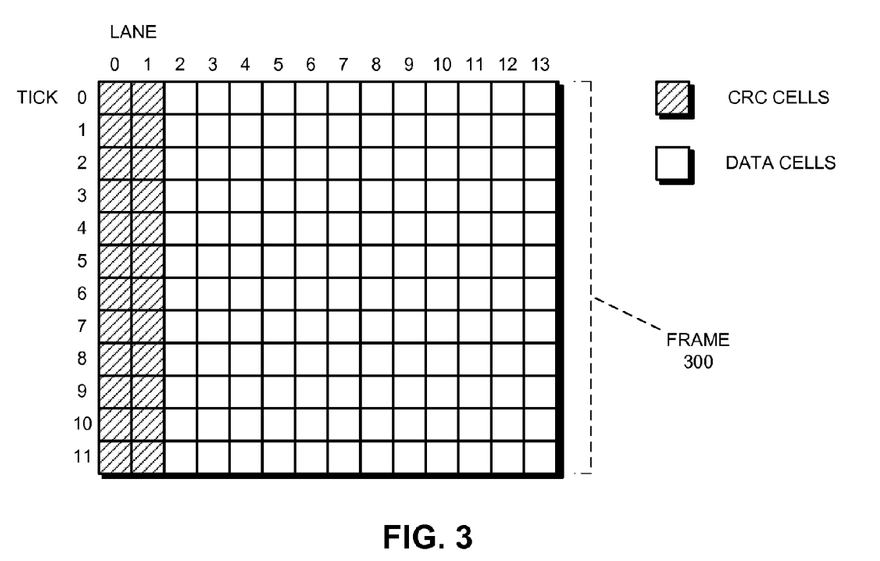
FIG. 3 presents an exemplary frame from a northbound link in accordance with the described embodiments.

FIG. 3 presents an exemplary frame 300 from a northbound link 200 (a "northbound frame") in accordance with the described embodiments. Among the 168 cells included in frame 300 are a number of cyclic redundancy check (CRC) cells and data cells. In FIG. 3, the cells are grouped according to the lane upon which they are transferred when frame 300 is transmitted across SERDES link 110. More specifically, a lane designation (0, 1, 2 ... 12, 13) is shown along the top of frame 300, while a "tick" designation is shown along the side of frame 300. A "tick" is a subdivision in the controlling clock for a TX 204 that transmits frame 300. For example, assuming an embodiment that uses a DRAM clock for timing, each tick is a subdivision of the DRAM clock. Thus, a transmitter (e.g., TX 204) that transmits 12 cells within a DRAM clock cycle transmits one cell per tick (or $\frac{1}{12}$th) of the DRAM clock.

Figure 4:
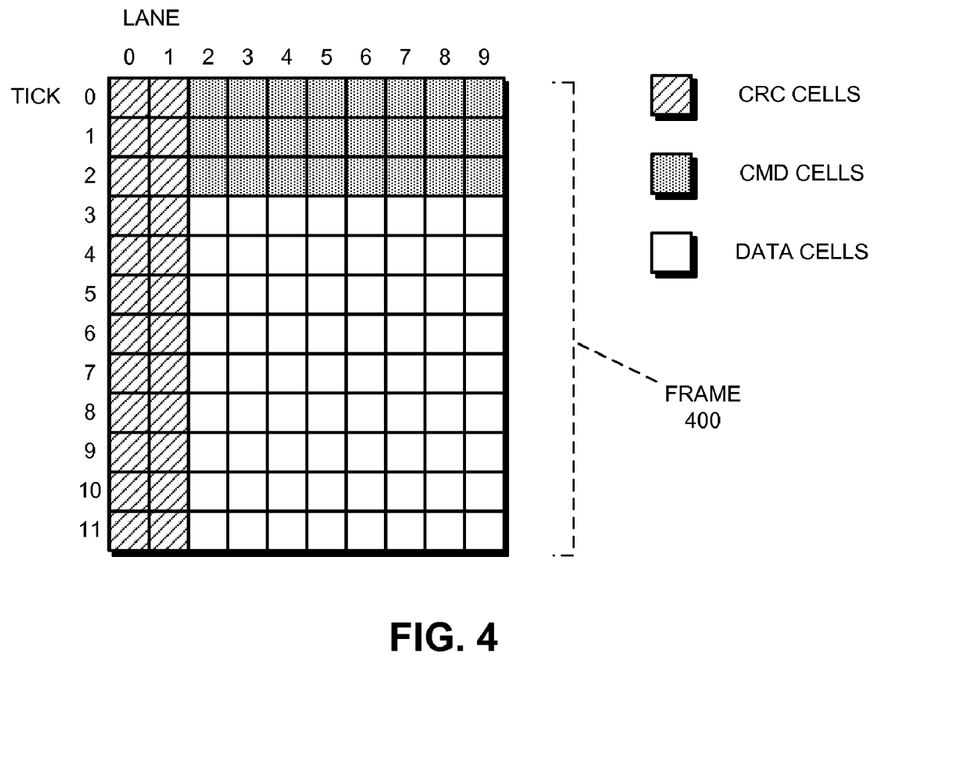
FIG. 4 presents an exemplary frame from a southbound link in accordance with the described embodiments.

FIG. 4 presents an exemplary frame 400 from a southbound link 202 (a "southbound frame") in accordance with the described embodiments. Among the 120 cells included in frame 400 are a number of cyclic redundancy check (CRC) cells, command (CMD) cells, and data cells. As with FIG. 3, in FIG. 4, the cells are grouped according to the lane upon which they are transferred. More specifically, a lane designation is shown along the top of frame 400, while a "tick" designation is shown along the side of frame 400.

In the described embodiments, the data signal on the SERDES link 110 needs to transition often enough to provide CDR 208 with sufficient transitions to correct for any "drift" in the PLL's oscillator (because the drift in the PLL oscillator can lead to skew between a clock in RX 206 and a clock in TX 204 on a SERDES link 110). For example, an "idle frame" or "sync frame" can be sent every N frames (i.e., every N clock cycles) to provide the transitions.

Generally, the sync frame interval, N, is dictated by the interval of phase-alignment that should be used to prevent excessive drift in the clock signal at RX 206. For example, N can be set so that a sync frame is sent every 32, 40, 42, 64, or 82 clock cycles. Alternatively, N can be set so that a sync frame is sent on a different periodic interval, for example, every 20, 30, or 57 frames. (Note that in some embodiments, when the lane width is reduced, thereby removing one or more lanes from active use, sync frames or other types of frames can be transmitted on the lanes that are not being used to keep the clock in the transmitter and receiver in those lanes synchronized.)

As shown in FIG. 2, in some embodiments, TX 204 includes a "forced-modulation" signal 210 (although only shown in memory system 108, TX 204 in host 106 can also include its own forced-modulation signal 210). When asserted, forced-modulation signal 210 causes TX 204 to automatically and immediately begin the process of switching to a given number of lanes on SERDES link 110. In some embodiments, an external device (e.g., a controller or a processor) can assert forced-modulation signal 210. For example, in some embodiments, a processor executing program code can assert forced-modulation signal 210 to cause TX 204 to begin transmitting frames using a maximum number of lanes in preparation for a predicted or expected bandwidth demand surge. Note that forced-modulation causes TX 204 to switch to the new number of lanes without first making any determination of the bandwidth demand on the link.

In some embodiments, forced-modulation signal 210 can indicate a number of lanes to which TX 204 is to switch. In alternative embodiments, forced-modulation signal 210 can simply cause TX 204 to switch to a predetermined number of lanes (e.g., a minimum number of lanes, a maximum number of lanes, or another number of lanes). In some of these embodiments, two or more separate forced modulation signals can be used to indicate different predetermined lane widths to be used by TX 204 (e.g., one signal indicates the minimum number of lanes, while the other indicates the maximum, etc.).

Note that although we describe the embodiments using the SERDES links 110 coupled between memory subsystem 108 and host 106, the other SERDES links 110 shown in FIG. 1 function in a similar way. Further note that other communication channels may be coupled between TX 204 and RX 206 in some embodiments. For example, lane width modulation indicator signal line(s), an acknowledge signal line, or one or more other sideband signals can be coupled between TX 204 and RX 206.

Modulating Link Width

As described above, each SERDES link 110 includes a number of lanes that can be used to transmit portions of frames on the link. Even when the lanes are not being used to transmit useful frames, the lanes can consume power because frames (including, for example, sync and NOP frames) must be sent to RX 206. Because power is consumed by even idle SERDES links 110, less power is available in the power budgets of the devices that are coupled to the SERDES link 110. This problem is particularly noticeable at a system level, where the aggregate power consumed by the individual SERDES links in a computer system 100 can be a noticeable portion of overall system power consumption.

To reduce the power consumed by the SERDES links 110 while still enabling the transmission of frames, the described embodiments dynamically change the number of lanes used to transfer frames based on the bandwidth demands for the SERDES link 110. Generally, the described embodiments reduce the number of lanes when bandwidth demands are low, and increase the number of lanes when the bandwidth demands are high. To enable these changes in the number of lanes, these embodiments also dynamically re-apportion the cells of each frame among the changed number of lanes.

Figure 5:
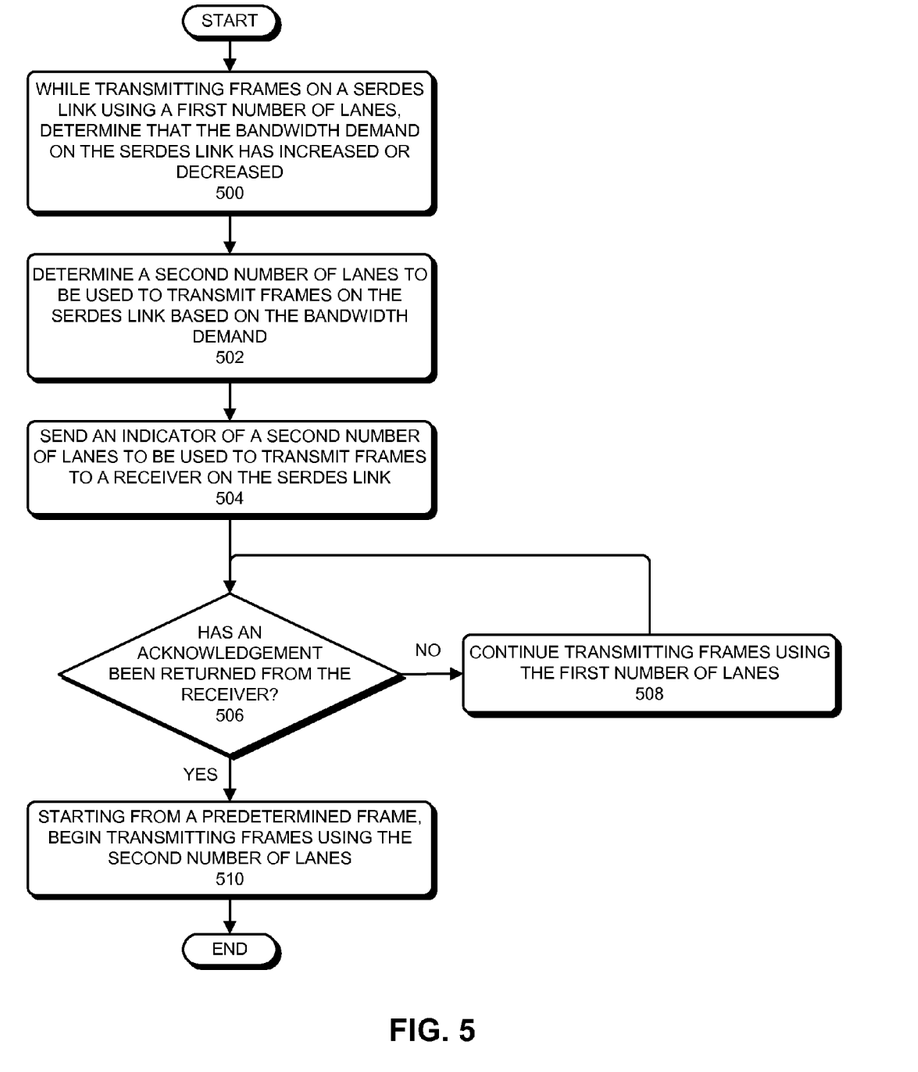
FIG. 5 presents a flowchart illustrating a process for modulating link width in accordance with the described embodiments.

FIG. 5 presents a flowchart illustrating a process for modulating link width in accordance with the described embodiments. As shown in FIG. 5, the process starts when a transmitter (e.g., TX 204) that is transmitting frames on a SERDES link 110 using a first number of lanes determines that the bandwidth demand on a SERDES link 110 has increased or decreased (step 500). In some embodiments, TX 204 determines bandwidth demand by: (1) determining a number of frames that is presently being transmitted; (2) monitoring commands being transferred across the high-speed link to determine when the number of frames being transmitted on the link is likely to change; (3) monitoring one or more system operations that are likely to result in an increase or decrease in the number of frames being transmitted; (4) using a record of prior bandwidth demand; (5) using one or more manually or automatically set values of bandwidth demand; (6) determining a number of transmit credits or receive credits exchanged between the transmitter circuit and the receiver in a predetermined time (in embodiments that use credits to control the transmission of frames on the SERDES link 110); (7) determining a number of transmit or receive queue full events or empty events in a predetermined time; or (8) determining changes in an indicator of quality of service (QOS) on the high-speed link. Alternatively, TX 204 can use two or more of these factors in combination to make the determination of bandwidth demand.

To enable the determination, the some embodiments include one or more thresholds that are each set at a predetermined bandwidth level. For example, in some embodiments, a first threshold can be set at 75% of the maximum bandwidth of the SERDES link, while a second threshold is set at 25% of the maximum bandwidth, and a third threshold is set at 5% of the maximum bandwidth. As another example, a single threshold can be set at 50% of the typical or average bandwidth of the link. In a further example, one or more thresholds can be dynamically set to percentages of the bandwidth in a prior second, minute, hour, day, etc. and adjusted as each second, minute, hour, day, etc. passes.

In some embodiments, the threshold is not based on a particular bandwidth level, but is instead based on one or more other indicators or factors. For example, a single threshold could be exceeded when a particular number of transmit queue full events occurs in a given time period (i.e., W queue full events in N milliseconds) and fallen below when a predetermined number of transmit queue empty events occurs in a given time period. Alternatively, a set of thresholds in these embodiments could be based on other events, including a different type of event for each threshold. For example, a first threshold could be based on a predetermined number of communications being buffered for a SERDES link 110, while a second threshold could be based on transmit or receive credits available.

In the following description, we refer to "threshold" in a general sense, i.e., as a particular level of a given monitored event at which a transition to a new number of lanes is triggered. More specifically, a "threshold" is not limited to being a particular bandwidth usage level on the SERDES link 110, but instead could relate to a predetermined level of any of the above-described parameters that can be used to determine, predict, or estimate bandwidth demand. Note also that "bandwidth demand" as used herein is a generic term and does not apply to any particular bandwidth level on SERDES link 110.

In some embodiments, each threshold is associated with a specified number of lanes to be used to transmit frames on the SERDES link 110. For example, assuming an embodiment that uses a single threshold, N, a predetermined number of lanes, M, can be used for transmitting frames when bandwidth demand is at or above N, while a second predetermined number of lanes, K, can be used for transmitting frames when bandwidth demand is below N. More specifically, in an embodiment that includes 16 lanes and has a single threshold set at 50% of typical link bandwidth, 16 lanes can be used to transmit frames when bandwidth demand is at or above 50% of typical bandwidth, while 12, 10, 8, 4, 2, or 1 lane can be used to transfer data when bandwidth demands are below 50%. Alternatively, in embodiments that include 16 lanes and have a threshold set at W queue full events being detected in P seconds, 16 lanes can be used to transmit frames when more than W events are detected in P seconds, while 12, 10, 8, 4, 2, or 1 lane can be used to transfer data when less than W queue full events are detected in P seconds.

In some of these embodiments, the lower threshold can occur where less than W-Z events have been detected in P seconds. In these embodiments, upon crossing a given threshold, TX 204 switches to the new number of lanes. TX 204 might not switch back to the other number of lanes upon re-crossing the threshold (i.e., exceeding or falling below the crossed threshold), but instead switches back upon crossing the other threshold. For example, upon exceeding W queue full events in P seconds, TX 204 can begin using 16 lanes. However, upon falling below W queue full events in P seconds, TX 204 may not begin to use a lower number of lanes (e.g., 8 lanes). TX 204 may not begin to use the lower number of lanes until falling below W-Z queue full events in P seconds. (Note that embodiments in which a threshold can be associated with more than one number of lanes are described in more detail in the following section.)

TX 204 then determines a second number of lanes to be used to transmit frames on the SERDES link 110 (step 502). For example, assume an embodiment that uses two thresholds, the first set at 70% of the maximum bandwidth of the SERDES link, and the second set at 30% of the maximum bandwidth. Further assume that there are 12 lanes available for the SERDES link 110, and the following specified number of lanes is used for each of the three bandwidth demand regions defined by these thresholds: (1) above 70%—12 lanes; (2) between 70%-30%—8 lanes; and (3) below 30%—3 lanes. If the bandwidth demand in this embodiment has increased from 45% of maximum bandwidth to 80%, TX 204 determines that the number of lanes to be used to transmit frames should be increased from 8 lanes to 12 lanes. On the other hand, if the bandwidth demand has decreased from 75% to 25%, TX 204 determines that the number of lanes to be used to transmit frames should be decreased from 12 lanes to 3 lanes. Note that other thresholds may be used in other embodiments, as described above.

TX 204 then sends an indication of a second number of lanes to be used to transmit frames to a receiver (e.g., RX 206) on the SERDES link 110 (step 504). In some embodiments, sending the indication involves including the indication in a next sync frame sent to the receiver on the SERDES link 110. For example, using the thresholds and lane numbers described above, if the bandwidth has increased from 25% to 77%, TX 204 can include an indication in the next sync frame that 12 lanes are to be used to transmit frames on the link. In some embodiments, sending the indication involves using a different mechanism, such sending the indicator to the receiver using a sideband signal associated with the SERDES link 110. Alternatively, other mechanisms can be used, such as a "mailbox" location in memory that is monitored by the transmitter and receiver, an interrupt system, or other mechanisms known in the art. Some embodiments use a combination of different mechanisms (e.g., a sync frame along with a sideband signal).

For clarity and brevity in the following description we use sync frames to describe the embodiments. However, the other indication mechanisms operate in a similar way. For example, the sideband signal can indicate a given number of lanes to the receiver, or can simply indicate that a transition up or down in number of lanes is to occur. Moreover, more than one sideband signal can be used to indicate transitions in the number of lanes.

In some embodiments, a specified portion of the sync frame is used to indicate the number of lanes that is to be used. For example, assuming a sync frame that includes 168 cells with one bit per cell, a predetermined number of cells can used to indicate when TX 204 has determined that the number of lanes is to be changed. For example, cell[167], cells[87]-[88], or cell[100] and cell[102] can be used.

In some embodiments, the indication can be an actual number of lanes (e.g., 8, etc.), and a sufficient number of cells in the sync frame is allocated for making the indication. In alternative embodiments, one or more bits can be used to indicate a current number of lanes from a set of possible numbers of lanes. For example, in some embodiments, there are only two numbers of lanes, a "maximum" number of lanes and a "reduced" number of lanes, and a single cell can be used to indicate which number of lanes is to be used.

In alternative embodiments, the indication can be an indication that the number of lanes is to be reduced or increased.

For example, a particular cell in the sync frame can indicate to RX 206 an increase in the number of lanes, while a different cell indicates to RX 206 a decrease in the number of lanes. In these embodiments, if the specified cell is asserted (e.g., by setting the cell to "1") RX 206 determines that the indicated change in the number of lanes is to be made. In these embodiments, RX 206 and TX 204 can include a table or a state machine that indicates a number of lanes to be used (i.e., the sequence of transitions in the number of lanes). The table can be consulted by TX 204 when adjusting the number of lanes or by RX 206 upon receiving an indication that the number of lanes is to be increased or decreased.

TX 204 then determines if an acknowledgment of the indicator has been returned from RX 206 (step 506). More specifically, in the described embodiments, RX 206 returns an acknowledge signal in response to receiving the indicator that specifies a new number of lanes that is to be used. In some embodiments, the acknowledgment is in the form of a "status frame" that is sent from the receiver on the SERDES link 110. In alternative embodiments, a different signal can be used, such as an acknowledgment sideband signal from RX 206 to TX 204, a mailbox/semaphore/shared memory location, etc.

Receiving the acknowledgement signal in the described embodiments means receiving an "error-free" acknowledgement signal. If RX 206 signals that an error has occurred while receiving the indicator, TX 204 does not begin transmitting on the new number of lanes, but instead restarts the process of modifying the number of lanes by resending the indicator. For example, in embodiments of the present invention wherein the sync frame is used to send the indicator of the new number of lanes, a status frame received from RX 206 indicating a cyclic redundancy check (CRC) error that includes the sync frame causes TX 204 to restart the lane width modification. Alternatively, in embodiments where a sideband signal is used, if no response is received by TX 204 within a given time after the indicator is sent, or if RX 206 otherwise behaves as if the indicator was not received (e.g., sending an explicit signal on the sideband signal indicating a receiving error) TX 204 restarts the lane width modification. Note that we herein use the term "acknowledge signal" or "acknowledgement" to indicate receiving a signal that acknowledges the error-free reception of the indicator.

In these embodiments, TX 204 can resend the indicator and receive the error signal in response a predetermined number of times (e.g., 5, 10, or 50 times) before terminating the process of modifying the lane width. If the modification attempt fails, TX 204 can continue to use a current number of lanes or can perform other error-handling routines.

If the acknowledgment is has not been received, TX 204 continues transmitting frames using the first number of lanes (step 508). TX 204 then returns to step 506 to determine if an acknowledgment has been received from RX 206.

On the other hand, if an acknowledgment of the indicator has been returned from the receiver, starting from a predetermined frame, TX 204 begins transmitting frames using the second number of lanes (step 510). As described above, this can involve using fewer lanes if the bandwidth demand has fallen, or more lanes if the bandwidth demand is has increased.

In the described embodiments, to avoid data corruption and other significant errors, TX 204 and RX 206 must be using the same number of lanes when transferring frames. Hence, TX 204 cannot begin sending frames using the modified number of lanes until RX 206 is prepared to accept the frames on the modified number of lanes. Consequently, the described embodiments use a predetermined frame at which TX 204 begins using the modified lane width. In the described embodiments, the predetermined frame occurs after the acknowledgement has been received from RX 206 by TX 204, but may or may not be based on when the acknowledgement is actually received. Generally, any negotiated frame at which TX 204 and RX 206 can agree to start using the modified lane width can be used. For example, in some embodiments, the predetermined frame is the first sync frame after TX 204 receives the acknowledgement signal from RX 206. In alternative embodiments, the Mth frame after sending the indicator or a Kth frame after receiving the acknowledgement is used.

Figure 6:
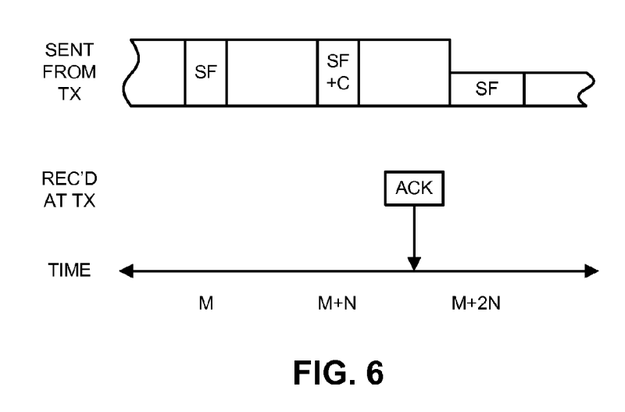
FIG. 6 presents a timeline illustrating a series of sync frames along with a transition in a number of lanes on a SERDES link in accordance with the described embodiments.

FIG. 6 presents a timeline illustrating a series of sync frames along with a transition in the number of lanes in accordance with the described embodiments. As previously indicated, although we use a sync frame to describe the transition to a new number of lanes (in both FIGS. 6-7), alternative embodiments use a different predetermined frame.

In FIG. 6, the sync frame interval is time "N" (the time intervals are not shown to scale in FIG. 6). The top of FIG. 6 shows a progression of frames "sent from TX" 204, while the bottom of FIG. 6 shows signals "received (rec'd) at TX" 204 from RX 206. More specifically, at time M, TX 204 transmits a sync frame (SF) with no indication of a change in the number of lanes that is to be used. At time M+N, TX 204 transmits a sync frame with an indication that a change (SF+C) is to be made in the number of lanes. TX 204 then awaits an acknowledgment from RX 206 to the sync frame with the indication of the change. TX 204 receives the acknowledge signal from RX 206 before the sync frame that is to be sent at time M+2N. In response to receiving the acknowledgment signal, TX 204 sends the sync frame at M+2N using the new number of lanes (as is shown by the exemplary change in shape of the frames sent from TX 204 in FIG. 6).

Figure 7:
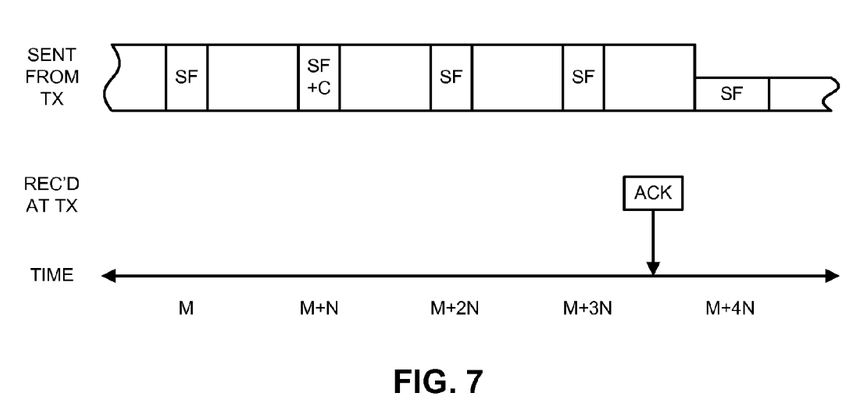
FIG. 7 presents a timeline illustrating a series of sync frames along with a transition in the number of lanes on a SERDES link in accordance with the described embodiments.

FIG. 7 presents a timeline illustrating a series of sync frames along with a transition in the number of lanes in accordance with the described embodiments. In FIG. 7, the sync frame interval is time "N" (the time intervals are not shown to scale in FIG. 7). The top of FIG. 7 shows a progression of frames "sent from TX" 204, while the bottom of FIG. 7 shows signals "received (rec'd) at TX" 204 from RX 206. More specifically, at time M, TX 204 transmits a sync frame (SF) with no indication of a change in the number of lanes that is to be used. At time M+N, TX 204 transmits a second sync frame with an indication that a change (SF+C) is to be made in the number of lanes. TX 204 then awaits an acknowledgment from RX 206 to the sync frame with the indication of the change. Because the acknowledgment is not received by the time that the next two sync frames are to be sent (at times M+2N and M+3N), TX 204 does not start transmitting frames using the indicated number of lanes (but instead continues to transmit frames using the same number of lanes). The acknowledge signal is then received from RX 206 before the sync frame that is to be sent at time M+4N. In response to receiving the acknowledgment signal, TX 204 sends the sync frame at M+4N using the new number of lanes (as is shown by the exemplary change in shape of the frames sent from TX 204 in FIG. 7).

Apportioning Frames

Because each frame in the described embodiments includes a specified number of cells, when TX 204 transitions to using a different number of lanes, the cells in the frame are re-apportioned and sent on the different number of lanes. For example, if 14 lanes are used to transmit frames with 168 cells, 12 cells are transferred on each lane for each frame. However, if 7 lanes are used to transmit frames with 168 cells, 24 cells are transferred on each lane for each frame. On the other hand, if 21 lanes are used to transmit frames with 168 cells, 8 cells are transferred on each lane for each frame. Thus, frames are elongated when the number of lanes is reduced and compressed when the number of lanes is increased.

Note that in some embodiments all the cells within a frame are sent, regardless of the number of lanes used to transmit the frames (i.e., all the information originally in the frame remains in the frame). Because no change occurs in the number of cells in the frame, hardware and software in computer system 100 (e.g., operating systems or applications executing on the processing subsystems, hardware controllers, etc.) need not be involved in the modification of the lane width. More specifically, aside from TX 204 and RX 206, the lane width and the modification of the lane width is transparent to applications, operating systems, processing subsystems, controllers, memory subsystems, etc. in computer system 100. (Note, however, that using forced-modification signal 210, an application, operating system, controller, or other system entity can force the number of lanes to a given value.)

Figure 8:
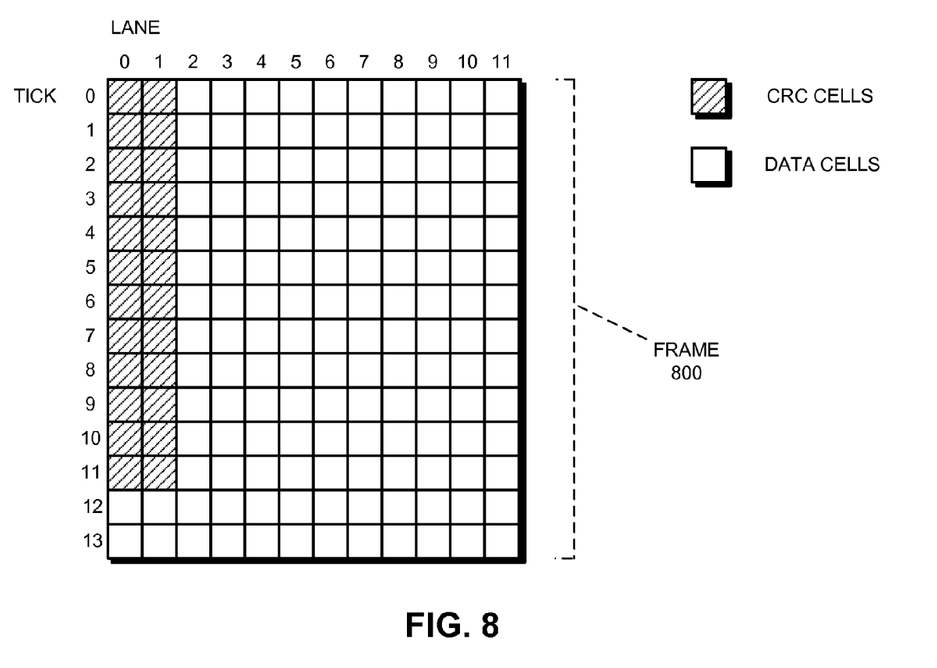
FIG. 8 presents a northbound frame configured to be sent using twelve lanes in accordance with the described embodiments.

FIG. 8 presents a northbound frame 800 configured to be sent using twelve lanes in accordance with the described embodiments. Comparing frame 800 with frame 300 from FIG. 3, it can be seen that frame 800 requires two additional ticks (i.e., 14 ticks) to be transmitted across the SERDES link 110. As described above, frame 300 is transmitted in one clock cycle. Because there are twelve ticks in a clock cycle, frame 800 takes more than a single clock cycle (by two ticks) for transmission across the SERDES link.

FIG. 8 presents the "elongation" of the frame enabled in the described embodiments. The reverse of elongation, or "compression" of the frame, can be seen by making the reverse comparison, i.e., comparing frame 800 with frame 300.

Figure 9:
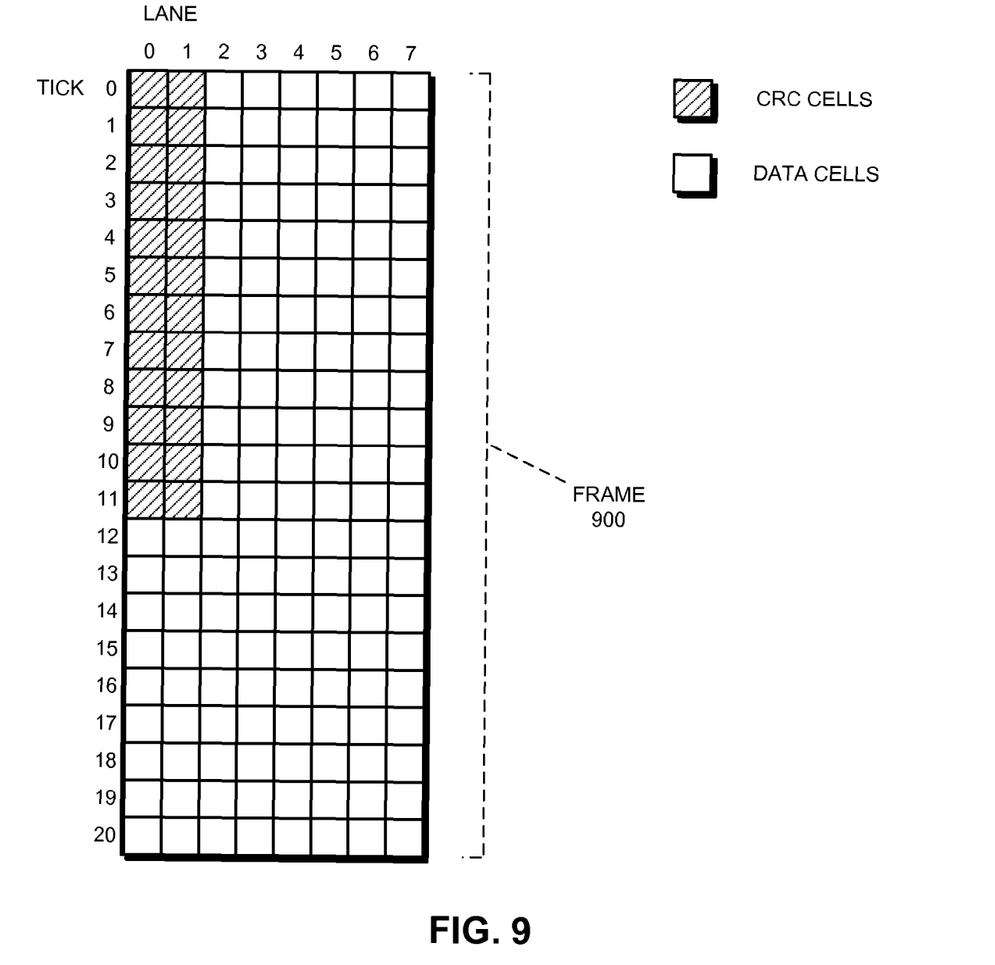
FIG. 9 presents a northbound frame configured to be sent using seven lanes in accordance with the described embodiments.

FIG. 9 presents a northbound frame 900 configured to be sent using eight lanes in accordance with the described embodiments. Comparing frame 900 with frame 300 from FIG. 3, it can be seen that frame 900 requires nine additional ticks (i.e., 21 ticks) to be transmitted across the SERDES link 110. As described above, frame 300 is transmitted in one clock cycle. Because there are twelve ticks in a clock cycle, frame 900 takes more than a single clock cycle (by nine ticks) for transmission across the SERDES link.

Figure 10:
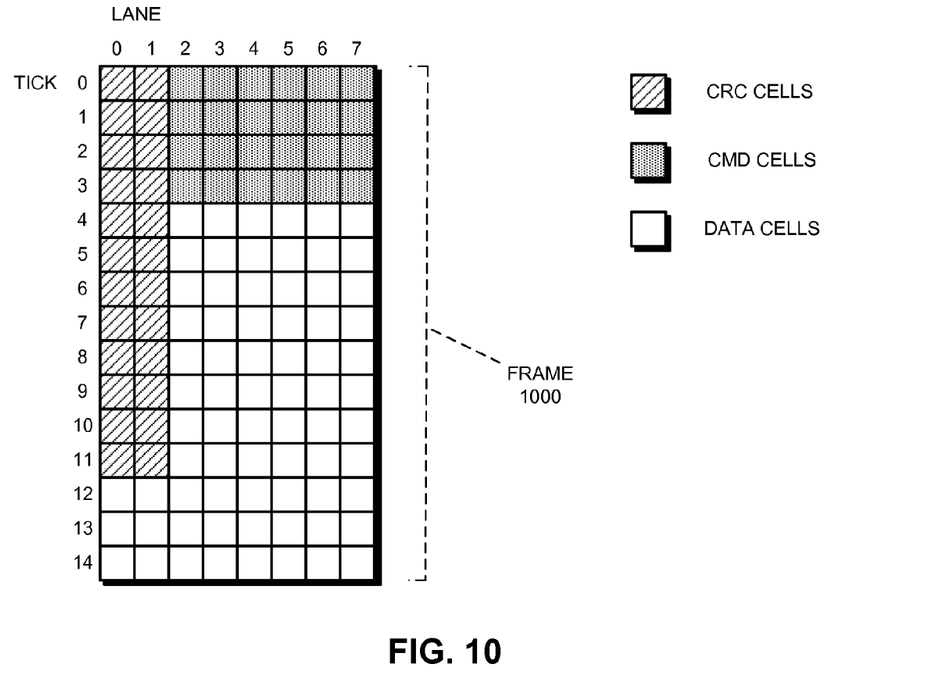
FIG. 10 presents a southbound frame configured to be sent using eight lanes in accordance with the described embodiments.

FIG. 10 presents a southbound frame 1000 configured to be sent using eight lanes in accordance with the described embodiments. Comparing frame 1000 with frame 400 from FIG. 4, it can be seen that frame 1000 requires three additional ticks (i.e., 15 ticks) to be transmitted across the SERDES link 110. As described above, frame 400 is transmitted in one clock cycle. Because there are twelve ticks in a clock cycle, frame 800 takes more than a single clock cycle (by three ticks) for transmission across the southbound SERDES link.

Some embodiments use numbers of lanes that cause the frames to be elongated and compressed on clock cycle boundaries. For example, assuming an embodiment that includes 16 lanes in a SERDES link, 8 lanes, 4 lanes, or 2 lanes can be used, which causes the frames to be sent in two clock cycles (i.e., in 24 ticks for a TX 204 that can send 12 cells on a lane per clock cycle), four clock cycles, or eight clock cycles, respectively.

In some embodiments, the interval of sending sync frames can be adjusted to account for the larger number of clock cycles used to send frames. More specifically, given an embodiment that elongates frames so that N clock cycles are used to send frames, the sync frame can be sent more often (i.e., with a lower number of intervening frames).

Note that although we use northbound and southbound frames as examples, other frame formats are handled using the same techniques. For example, other frame formats may not include CRC cells, or may include a different number of CRC cells.

Sequences for Link Width Modulation

Although we describe embodiments where the number of lanes is set to a single specified value according to the determined bandwidth demand of a link, in alternative embodiments other techniques can be used to set the number of lanes. For example, some embodiments can step through a specified sequence of steps in the number of lanes based on the determined bandwidth demand.

Figure 11:
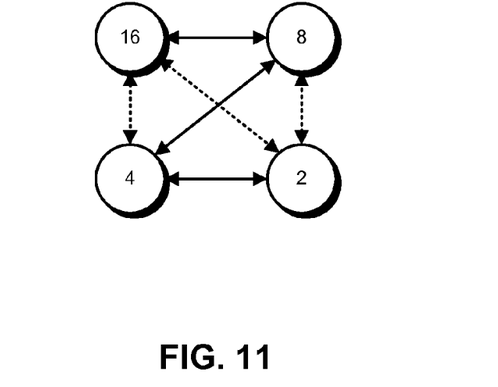
FIG. 11 presents a state diagram illustrating an exemplary progression of link widths in accordance with the described embodiments.

FIG. 11 presents a state diagram illustrating an exemplary progression of link widths in accordance with the described embodiments. As can be seen in FIG. 11, the SERDES link uses 16 lanes initially, but based on a reduction in bandwidth demand, the transmitter (e.g., TX 204) reduces the number of lanes to eight. If the bandwidth demand on the link remains at the reduced level a first predetermined time (100 ms, 1 s, 1 min., etc.) the transmitter further reduces the number of lanes to four. If the bandwidth demand for the link subsequently remains at the reduced level for a second, and possibly different, predetermined time interval (100 ms, 1 s, 1 min., etc.), the transmitter further reduces the number of lanes to two.

In another example, the transmitter can automatically step through a predetermined sequence of one or more intermediate numbers of lanes to arrive at an intended number of lanes. Unlike the embodiment described in the previous paragraph, in these embodiments, upon determining that a change in the number of lanes is to be made, the transmitter automatically steps through the intermediate number of lanes to reach an intended number of lanes without making any subsequent determination of the bandwidth demand. For example, assume that the transmitter has determined based on the bandwidth demand on a SERDES link 110 that two out of eight active lanes on the link are to be used to transfer frames. Instead of proceeding directly from using eight lanes to using two lanes, however, these embodiments can use, for example, six lanes, then four lanes, then two lanes. The transmitter can wait a predetermined time after each change in the number of lanes before making a next change in the number of lanes. By following this pattern, the transmitter circuit can ensure that a large number of transmission/receiving circuits on SERDES link 110 do not simultaneously start or stop operation (thereby avoiding possible side-effects such as spikes or drops in power-supply voltage, etc.).

These embodiments can also increase the number of lanes in the same way if the bandwidth demand rises. Specifically, these embodiments need not return directly to the maximum number of lanes when the bandwidth demand rises. The number of lanes can instead be stepped up to the maximum number of lanes using similar sequences.

Note that although we describe a particular pattern for reducing and increasing the number of lanes in the exemplary link, alternative embodiments use different transitions or different numbers of lanes. For example, some different transitions in the number of lanes are shown by the dashed arrows in FIG. 11.

Turning Off Transmission Circuits for Unused Lanes

Although in some embodiments lanes remain powered-up even when not being actively used to transmit frames, some embodiments transition to low-power states to save additional power for the SERDES links 110. Generally, when reducing the number of lanes that is used in a given SERDES link 110, these embodiments can also place the transmission circuits in a low-power state (or can reduce the power to the transmission circuits). For example, these embodiments can use the well-known L0s or L1 low-power states, or can use customized low-power states in which some or all of the functional blocks of the transmitting or receiving circuits are shut down.

Placing these circuits in a low-power state can incur additional restart time which should be factored into the startup time as the lanes in the link are subsequently reactivated. More specifically, there may be significant protocol overhead in resuming operation for lanes for which the circuits have been completely shut down than for lanes on which data is simply not being transmitted. For example, receiver circuits (e.g., RX 206) that are completely shut down may need to regenerate the clock signal as described above. Thus, in some embodiments, the power to the lane circuits is reduced in proportion to the expected time available for re-enabling the lane circuits when bandwidth demand exceeds an associated threshold.

The foregoing descriptions have been presented only for purposes of illustration and description. They are not intended to be exhaustive or to limit the described embodiments to the forms disclosed. Accordingly, many modifications and variations will be apparent to practitioners skilled in the art. Additionally, the above disclosure is not intended to limit the described embodiments. The scope of these embodiments is defined by the appended claims.

What is claimed is:

1. An apparatus for modulating a width of a high-speed link, comprising:
   a transmitter circuit coupled to the high-speed link, wherein the high-speed link includes N lanes, and wherein the high-speed link is used to transmit frames of data that each comprise a constant number of cells, each cell containing a separate portion of the data in the frame;
   wherein while using a first number of lanes to transmit frames on the high-speed link with each of the first number of lanes being used to transmit a corresponding separate portion of the cells in each frame in parallel, wherein the portion of the cells in each frame that is transmitted using each lane is determined in accordance with the first number of lanes, the transmitter circuit is configured to:
      determine a second number of lanes to be used to transmit frames on the high-speed link based on a bandwidth demand on the high-speed link; and
      send an indicator of the second number of lanes to a receiver on the high-speed link; and
      in response to an acknowledgement of the indicator received from the receiver, transmit subsequent frames on the high-speed link using the second number of lanes from a predetermined frame with each of the second number of lanes being used to transmit a corresponding separate portion of the cells in each frame in parallel, wherein the portion of the cells in each frame that is transmitted using each lane is determined in accordance with the second number of lanes; and
      receive an error signal from the receiver in response to the indicator and, in response to the error signal, resend the indicator of the second number of lanes to the receiver until the error signal is received in response a predetermined number of times, whereupon the transmitter circuit is configured to terminate attempting to change the number of lanes and continue transmitting frames on the high-speed link using the first number of lanes.

2. The apparatus of claim 1, wherein the transmitter circuit is further configured to:
   send the indicator of the second number of lanes in a sync frame sent to the receiver; or
   send a message to the receiver on a side-band signal associated with the high-speed link.

3. The apparatus of claim 1, wherein the error signal is a cyclic redundancy check (CRC) error message received in a status frame from the receiver.

4. The apparatus of claim 1, wherein the transmitter circuit is configured to:
   receive a forced-modulation signal that identifies a third number of lanes that the transmitter circuit is to use to transmit subsequent frames on the high-speed link;
   immediately send an indicator of the third number of lanes to the receiver on the high-speed link; and
   upon receiving an acknowledgment of the indicator of the third number of lanes from the receiver, transmit subsequent frames on the high-speed link using the third number of lanes.

5. The apparatus of claim 1, wherein the predetermined frame is:
   a next sync frame;
   an Mth frame after sending the indicator; or
   a Kth frame after receiving the acknowledgement.

6. The apparatus of claim 1, wherein until the acknowledgment of the indicator of the second number of lanes is received, the transmitter circuit is configured to continue to transmit frames on the high-speed link using the first number of lanes.

7. The apparatus of claim 1, wherein the transmitter circuit is configured to:
   determine a decreased number of lanes to be used to transmit frames on the high-speed link based on a decrease in bandwidth demand; or
   determine an increased number of lanes to be used to transmit frames on the high-speed link based on an increase in bandwidth demand.

8. The apparatus of claim 1, wherein the transmitter circuit is further configured to:
   determine at least one intermediate number of lanes prior to determining the second number of lanes;
   send an indicator of the intermediate number of lanes to the receiver;
   receive an acknowledgment of the indicator of the intermediate number of lanes from the receiver; and
   transmit subsequent frames on the high-speed link using the intermediate number of lanes.

9. The apparatus of claim 1, wherein to determine an actual, estimated, or predicted bandwidth demand, the transmitter circuit is configured to:
   determine a number of frames that is presently being transmitted;
   monitor commands being transferred across the high-speed link;
   monitor one or more system operations that are likely to result in an increase or decrease in the number of frames being transmitted;
   use a record of prior bandwidth demand levels;
   use one or more manually or automatically set values of bandwidth demand level;
   determine a number of transmit credits or receive credits exchanged between the transmitter circuit and the receiver in a predetermined time;
   determine a number of transmit or receive queue full events or empty events in a predetermined time; or
   determine changes in an indicator of quality of service (QOS) on the high-speed link.

10. A method for modulating a width of a high-speed link coupled to transmitter circuit, comprising:
in the transmitter circuit,
transmitting frames of data using a first number of lanes, wherein each frame comprises a constant number of cells, each cell containing a separate portion of the data in the frame, wherein each lane of the first number of lanes is used to transmit a corresponding separate portion of the cells in each frame in parallel, and wherein the portion of the cells in each frame that is transmitted using each lane is determined in accordance with the first number of lanes;
determining a second number of lanes to be used to transmit frames on the high-speed link based on a bandwidth demand on the high-speed link;
sending an indicator of the second number of lanes to a receiver on the high-speed link; and
in response to receiving an acknowledgement of the indicator from the receiver, transmitting subsequent frames on the high-speed link using the second number of lanes from a predetermined frame with each of the second number of lanes being used to transmit a corresponding separate portion of the cells in each frame in parallel, wherein the portion of the cells in each frame that is transmitted using each lane is determined in accordance with the second number of lanes; and
receiving an error signal from the receiver in response to the indicator, and, resending the indicator of the second number of lanes to the receiver until receiving the error signal in response a predetermined number of times, whereupon the method further comprises terminating attempting to change the number of lanes and continuing transmitting frames on the high-speed link using the first number of lanes.

11. The method of claim 10, wherein sending the indicator of the second number of lanes comprises:
including the indicator of the second number of lanes in a sync frame sent to the receiver; or
sending a message to the receiver on a side-band signal associated with the high-speed link.

12. The method of claim 10, wherein the method further comprises:
receiving a forced-modulation signal that identifies a third number of lanes to use to transmit subsequent frames on the high-speed link;
immediately sending an indicator of the third number of lanes to the receiver on the high-speed link; and
upon receiving an acknowledgment of the indicator of the third number of lanes from the receiver, transmitting subsequent frames on the high-speed link using the third number of lanes.

13. The method of claim 10, wherein until receiving the acknowledgment of the indicator of the second number of lanes, the method further comprises continuing to transmit frames on the high-speed link using the first number of lanes.

14. The method of claim 10, wherein determining the second number of lanes comprises:
determining a decreased number of lanes to be used to transmit frames on the high-speed link based on a decrease in bandwidth demand; or
determining an increased number of lanes to be used to transmit frames on the high-speed link based on an increase in bandwidth demand.

15. The method of claim 10, wherein prior to determining the second number of lanes to be used to transmit frames on the high-speed link, the method further comprises:
determining at least one intermediate number of lanes;
sending an indicator of the intermediate number of lanes to the receiver;
receiving an acknowledgment of the indicator of the intermediate number of lanes from the receiver; and
transmitting subsequent frames on the high-speed link using the intermediate number of lanes.

16. The method of claim 10, wherein the method further comprises:
determining a number of frames that is presently being transmitted;
monitoring commands being transferred across the high-speed link;
monitoring one or more system operations that are likely to result in an increase or decrease in the number of frames being transmitted;
using a record of prior bandwidth demand levels;
using one or more manually or automatically set values of bandwidth demand level;
determining a number of transmit credits or receive credits exchanged between the transmitter circuit and the receiver in a predetermined time;
determining a number of transmit or receive queue full events or empty events in a predetermined time; or
determining changes in an indicator of quality of service (QOS) on the high-speed link,
to determine an actual, estimated, or predicted bandwidth demand.

17. A computer system for modulating a width of a high-speed link that includes N lanes, comprising:
a transmitting subsystem and a receiving subsystem coupled to the high-speed link; and
a transmitter circuit in the transmitting subsystem configured to:
transmit frames of data using a first number of lanes, wherein each frame comprises a constant number of cells, each cell containing a separate portion of the data in the frame, wherein each lane of the first number of lanes is used to transmit a corresponding separate portion of the cells in each frame in parallel, and wherein the portion of the cells in each frame that is transmitted using each lane is determined in accordance with the first number of lanes;
determine a second number of lanes to be used to transmit frames on the high-speed link based on a bandwidth demand on the high-speed link;
send an indicator of the second number of lanes to the receiver circuit; and
in response to receiving an acknowledgement of the indicator from the receiver circuit, transmit subsequent frames on the high-speed link using the second number of lanes from a predetermined frame with each of the second number of lanes being used to transmit a corresponding separate portion of the cells in each frame in parallel, wherein the portion of the cells in each frame that is transmitted using each lane is determined in accordance with the second number of lanes; and
receive an error signal from the receiver in response to the indicator and, in response to the error signal, resend the indicator of the second number of lanes to the receiver until the error signal is received in response a predetermined number of times, whereupon the transmitter circuit is configured to terminate attempting to change the number of lanes and continue transmitting frames on the high-speed link using the first number of lanes.

* * * * *